Figure 1:
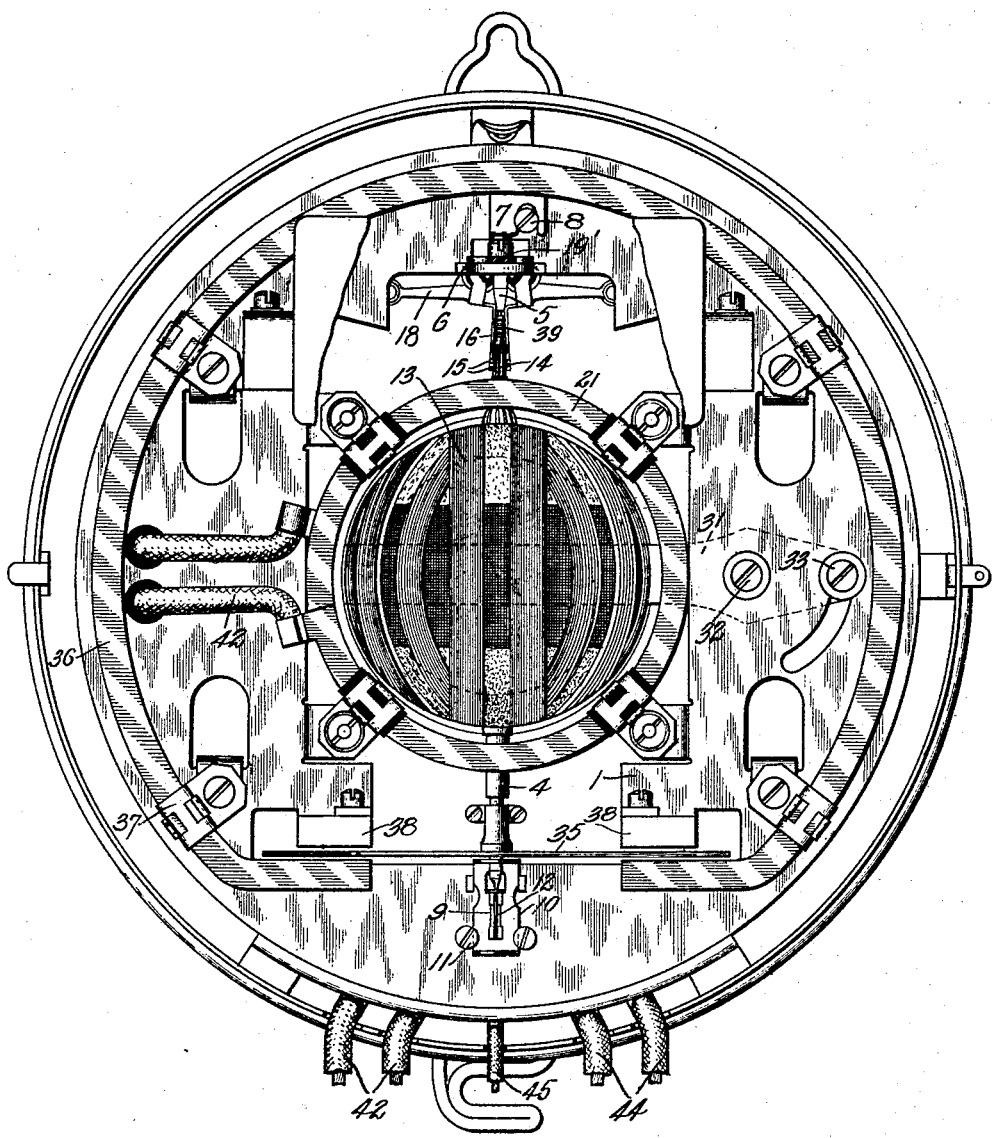

W. H. PRATT & C. E. HOLMES.
ELECTRIC METER.
APPLICATION FILED JUNE 5, 1905.

908,135.

Patented Dec. 29, 1908.

3 SHEETS—SHEET 1.

Witnesses:

Inventors
William H Pratt,
Charles E Holmes,
By Albert G Davis
Att'y.

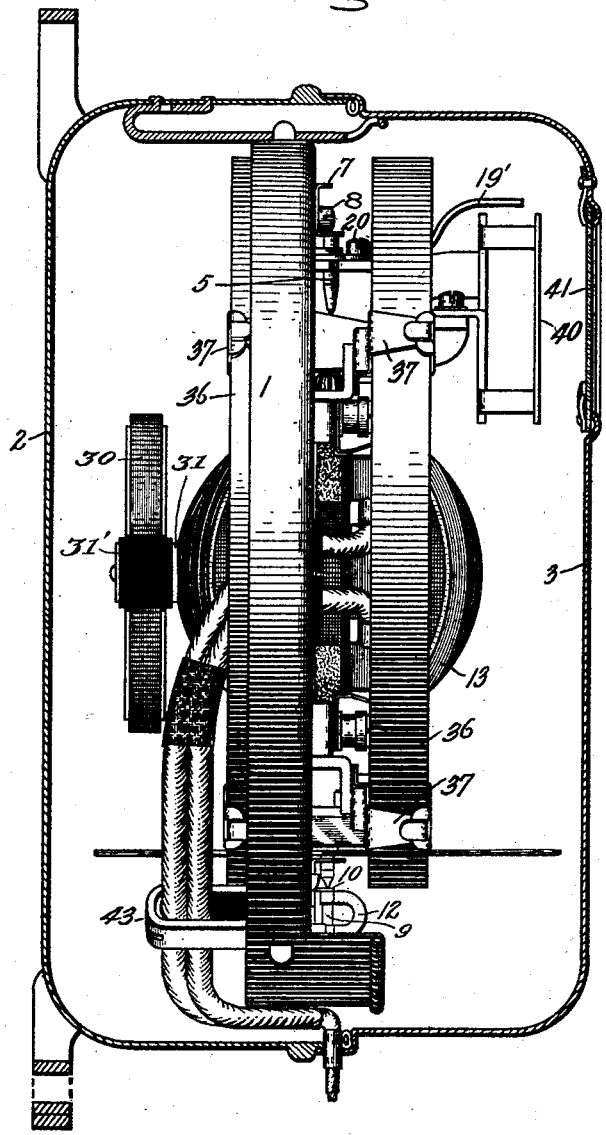

W. H. PRATT & C. E. HOLMES.
ELECTRIC METER.
APPLICATION FILED JUNE 6, 1905.
908,135.
Patented Dec. 29, 1908.
3 SHEETS—SHEET 3.
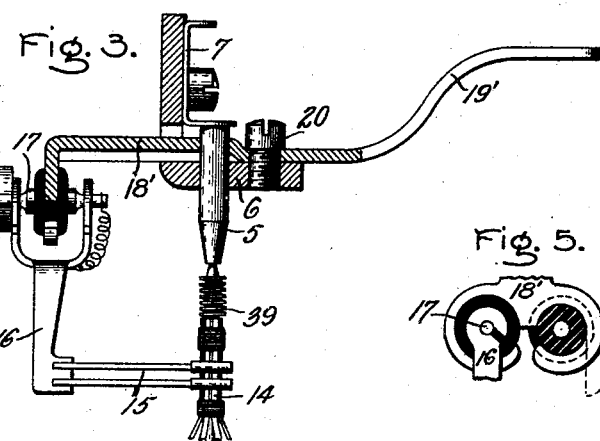
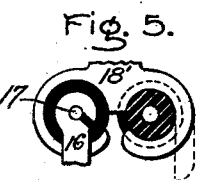
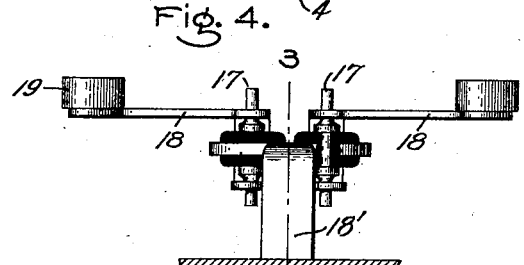
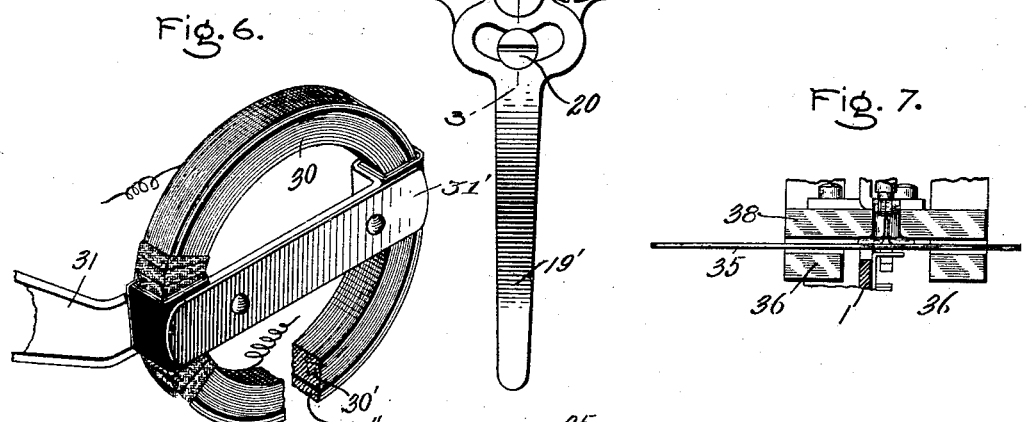
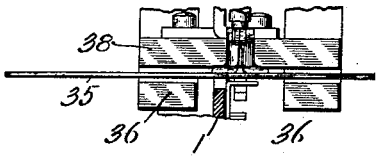
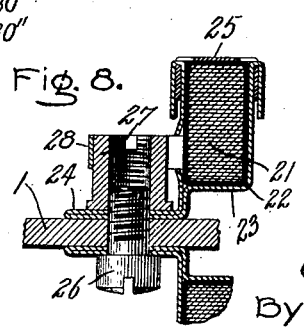
Witnesses:
Inventors,
William H. Pratt,
Charles E. Holmes,
By Albt. G. Davis
Att'y.

UNITED STATES PATENT OFFICE

WILLIAM H. PRATT AND CHARLES E. HOLMES, OF LYNN, MASSACHUSETTS, ASSIGNORS TO GENERAL ELECTRIC COMPANY, A CORPORATION OF NEW YORK.

ELECTRIC METER.

No. 908,135.      Specification of Letters Patent.      Patented Dec. 29, 1908.

Application filed June 5, 1905. Serial No. 263,694.

*To all whom it may concern:*

Be it known that we, WILLIAM H. PRATT and CHARLES E. HOLMES, citizens of the United States, residing at Lynn, county of Essex, State of Massachusetts, have invented certain new and useful Improvements in Electric Meters, of which the following is a specification.

This invention relates to electric meters and more particularly to integrating electric meters of the commutating motor type.

The primary object of our invention is to provide an integrating electric meter of simple construction and having the parts compactly arranged so that it will be inexpensive to produce.

We employ an electric motor mechanism driving a dial train and having its rotations retarded by one or more permanent magnets as is usual in these meters. The retarding magnets are of circular form and completely encircle the motor mechanism as this permits of a reduction of the size of the meter and is a very convenient arrangement of the parts and in order that the strength of the magnets may not be affected by the field set up by the coils of the motor mechanism we arrange the magnets concentric with the series coil or coils of the motor.

Instead of regulating the speed of the meter by adjusting the damping effect as has been the practice in meters of this type prior to our invention, we employ a new means of regulating the speed consisting in mounting the brushes so that they can be adjusted circumferentially above the commutator to vary the point of contact therewith and thus vary the torque-producing effect of the current flowing in the coils of the armature.

In order to economize space within the meter casing and reduce the cost of the meter we wind the resistance which is commonly inserted in the potential circuit of the meter in continuation of and in the same coil with the auxiliary field coil which is employed to compensate for friction in the meter, the resistance being wound non-inductively so that it does not coöperate with the armature of the motor mechanism to produce a torque.

These and other features of our invention will be better understood by reference to the following description taken in connection with the accompanying drawings which show the preferred embodiment thereof.

The novel features of our invention will be definitely indicated in the claims appended hereto.

Referring to the drawings, Figure 1 is a front view of the meter with the cover removed; Fig. 2 is an elevation with the casing in section; Fig. 3 is a section of the brush holder on line 3 3 of Fig. 4; Fig. 4 is a plan view of the brush holder; Fig. 5 is a detail of the same; Fig. 6 is a perspective view of the resistance and friction compensating coil; Fig. 7 is a detail of the damping device; and Fig. 8 is a detail of the clamps for securing the series coils in position.

Referring to the drawings, all of the operating parts of the meter are assembled upon a supporting member 1 consisting of a sheet-metal plate having integral arms punched and bent out therefrom to form supports for some of the parts and this supporting member is detachably mounted within a casing consisting of a back 2 and cover 3, preferably as described in the application of Charles E. Holmes, Serial No. 233,942, filed November 23, 1904.

Mounted for rotation in bearings carried by the supporting member 1 is a shaft 4. The upper bearing consists of a plug 5 which extends through an opening in an arm 6 bent out from the supporting member 1. A sheet-metal strip 7 is secured to the end of plug 5 and has a slot cut therein and a screw 8 extends through this slot and into the member 1 so that by loosening the screw the bearing plug 5 can be adjusted vertically in the opening in arm 6 by means of the strip 7. The lower bearing is preferably constructed in a manner similar to that shown in the pending application above referred to. The jewel step bearing is carried in a short tube 9 supported on a sheet-metal strip 10 which is adjustable vertically between suitable guides and may be locked in any adjusted position by screws 11. A looped member 12 is secured to the tube 9 to facilitate removing or inserting the tube in position. The shaft 4 carries an armature 13, the coils of which are preferably wound to form a sphere having an air core. The coils of the armature are connected to the segments of a small commutator 14 carried by shaft 4 and brushes 15 bear on the commutator to carry the current to and from the coils of the armature.

The brushes 15 are carried by holders 16 (Figs. 3 and 4) which are pivotally suspended from rods 17 and are provided with laterally-extending arms 18 carrying weights 19 at their outer ends. The holder 16 may be slotted, as shown in Fig. 5, to facilitate assembling the parts. The weights 19 tend to turn the holders 16 on their pivots and thus hold the brushes against the commutator with a constant pressure. Each of the brush holders 16 is formed from a sheet-metal blank, bent, as illustrated in Figs. 3 and 4, to form a downwardly-extending arm to which the brush 15 is secured, upwardly-extending ears by which the holder is pivotally supported on the rod 17, and a lateral arm to which the weight 19 is secured. The rods 17 are carried by but insulated from a support 18' having an opening therein through which the bearing plug 5 extends so that the plug forms a pivot concentric with the commutator 14 about which the support 18' can be turned. Support 18' is provided with a forwardly-extending arm 19' in which a slot is cut concentric with the opening for the post 5. A screw 20 extends through this slot and into an opening in the arm 6 so that by loosening the screw the support 18' and the brushes carried thereby can be turned by the arm 19' on an axis concentric with the commutator 14 so as to adjust the position of the brushes 15 with respect to the commutator 14, and when the brushes are in the desired position the support 18' may be locked by the screw 20. Changing the position of the brushes in this manner changes the paths for the current in the armature coils with respect to the magnetic field set up by the series coils and this varies the torque-producing effect of the armature current and with it the speed of the meter.

Mounted in inductive relation to the armature 13 are two field coils 21. These coils are preferably circular and mounted on opposite sides of shaft 4 closely encircling the portions of the armature inclosed thereby so as to reduce the number of stray lines of force; they are formed from ribbon conductor wound on edge with the several turns insulated one from another. The field coils 21 are secured in position by clamps which grip the coils and are fastened to the supporting member 1. The coils are wrapped with insulating material 22 (Fig. 8) and sheet-metal strips are bent so as to partially encircle the coil and to form a laterally-extending arm 24 which lies alongside the supporting member 1. At its ends the strip 23 is cut to form fingers which extend through openings in a clip 25 and are bent back upon the clip so as to hold the coil tightly between the strip 22 and the clip 25. A screw 26 extends through openings in the arms 24 and an opening in an ear formed on the supporting member 1, and a nut 27 is tightened up upon the end of screw 26 to hold the parts securely in position. A band 28 may be provided encircling the nut 27 and secured to the strip 22 to hold the nut in position while the parts are being assembled.

In order to compensate for friction in the meter an auxiliary field coil is employed also mounted in inductive relation to the armature 13 and arranged to be adjustable so that its compensating effect may be regulated. This coil 30 is clamped by a plate 31' to an arm 31 which is pivoted to the back of the supporting member 1 as indicated at 32, and on the other side of the pivot carries a screw 33 which extends through a curved slot in member 1 concentric with the pivot of arm 31. To adjust the effect of coil 30, the screw 33 is loosened and the arm turned on its pivot 32 and when the coil is in the desired position it is locked by tightening screw 33. The coil is thus adjustable in its own plane (the plane of the paper in Fig. 1) around the pivot 32 as a center. The coil 30 is connected in series with the armature 13 and in order that only a small current shall flow in this circuit it is usual to insert a resistance of large ohmic value therein. We wind this resistance and the compensating coil in a single coil so that no additional space is required for the resistance. However, the portion of the coil which is useful only as resistance must have no inductive effect upon the armature 13. For this reason we make the coil 30 by winding a portion 30' of the turns in one direction and the remaining portion 30'' in the opposite direction, the difference between the numbers of turns in the two portions being the number required in the shunt field coil to give the necessary friction compensation.

In order to retard the rotation of the moving element of the meter a disk 35 of conducting material is mounted on the shaft 4 and one or more permanent magnets are so arranged that the disk cuts their fields. For this purpose we use two large circular magnets 36 which on account of their length retain the magnetism more permanently. These magnets are secured on opposite sides of the supporting member 1 by suitable clamps 37. As shown in the drawings, the magnets are arranged concentrically with the series coils 21 of the motor mechanism. This is of great importance for the reason that otherwise their magnetism would be materially affected by the field set up by the series coils. In event of a short circuit upon the meter circuit an abnormally large current would flow through the series coils 21 and set up a strong magnetic field and if the magnets were so mounted that the lines of force of this field would thread them lengthwise their strength would be changed considerably and the meter would therefore be inaccurate when the short circuit was removed. The poles of the magnets 36 extend under the disk 35 and armatures 38 are secured to ears formed on the supporting member 1 above the disk and directly over the poles of the permanent magnets. Each armature 38 therefore carries the lines of force from the pole of one magnet to the opposite pole of the other magnet and the disk is intersected twice by these lines.

Directly above the commutator 14 on shaft 4 is a worm 39 which meshes with a worm-wheel in driving relation to the wheel train of a dial register 40, and a glass 41 is secured over an opening in the cover 3 of the meter casing through which the dial 40 may be seen.

The leads to the coils of the meter enter openings in the casing and run direct to the coils without the interposition of binding posts, preferably in the manner described in the pending application above referred to. The meter illustrated in the drawings is adapted for use upon a three-wire circuit and therefore five leads are shown entering the casing. Two of the leads 42 are carried through openings in the supporting member 1 and are connected to the front series coil 21, a clamp 43 being arranged to hold these leads in position. The leads 42 are thus held securely and by removing the screws 26 which hold the front series coil 21 to the supporting member the coil can be swung around to one side, the flexible leads serving as a hinge, so as to permit access to or the removal of the moving element of the meter for inspection, adjustment or repair. Two similar leads 44 extend to the other series coil and a lead 45 connects the potential circuit of the meter to the neutral of the three-wire system.

We do not wish to be understood as limited to the specific construction which we have herein shown and described as many modifications can be made therein without departing from the spirit of our invention; all such modifications we aim to cover by the terms of the claims appended hereto.

What we claim as new and desire to secure by Letters Patent of the United States, is,—

1. In an electric measuring instrument, a moving element, an actuating coil therefor having its axis perpendicular to the shaft of the moving element, and a circular permanent magnet for damping the movement of the moving element mounted concentric with the actuating coil.

2. In an electric measuring instrument, a moving element, an actuating coil therefor, a plate of conducting material carried by the moving element, and a permanent magnet encircling the actuating coil with its poles adjacent to said plate.

3. An integrating electric meter comprising a motor mechanism, a plate of conducting material carried by the moving element thereof, and a permanent magnet encircling the motor mechanism with its poles adjacent to said plate.

4. An integrating electric meter comprising a motor mechanism having an actuating coil having its axis perpendicular to the shaft of the moving element, a plate of conducting material carried by the moving element thereof, and a circular permanent magnet mounted concentric with said actuating coil with its poles adjacent to said plate.

5. An integrating electric meter comprising a shaft, an armature carried thereby, a series coil mounted in inductive relation to the armature with its axis perpendicular to the armature shaft, a plate of conducting material carried by the shaft, and a circular permanent magnet mounted concentric with said series coil with its poles adjacent to said plate.

6. An integrating electric meter comprising a shaft, an armature and a commutator to the segments of which the coils of the armature are connected carried thereby, brushes bearing on the commutator, field coils mounted in inductive relation to the armature with their axes perpendicular to the armature shaft, a dial geared to the shaft, a disk of conducting material carried by the shaft, and a permanent magnet mounted concentric with the field coils with its poles adjacent to the disk.

7. In an electric meter, a shaft, an armature and a commutator to the segments of which the coils of the armature are connected carried thereby, a field coil in inductive relation to the armature, a stationary support adjustably pivoted concentrically with the commutator, brushes pivotally mounted on the support bearing on the commutator, a register geared to the shaft, and means for retarding the rotations of the shaft.

8. In an electric meter, a shaft, an armature and a commutator to the segments of which the coils of the armature are connected carried thereby, a field coil in inductive relation to the armature, a stationary support adjustably pivoted concentrically with the commutator, a clamping means for said support, brushes pivotally mounted on said support and bearing on the commutator, a register geared to the shaft, and means for damping the rotations of the shaft.

9. In an electric meter of the commutator type, the combination in a single coil of a friction starting coil, and a resistance in series with the armature of such value as will render the amount of current in the armature circuit substantially independent of the counter-electromotive force of the meter armature.

10. In an electric meter of the commutator type, a shaft, an armature carried thereby, a field coil mounted in inductive relation to the armature, and a coil mounted in proximity to the armature and constituting both a friction compensating coil and a resistance in series with the armature of such a value as will render the amount of current in the armature circuit substantially independent of the counter-electromotive force of the meter armature.

11. In an electric meter of the commutator type, a shaft, an armature carried thereby, a coil mounted in inductive relation to the armature, means for connecting said coil in series in a circuit, a coil mounted in proximity to the armature and constituting both a friction compensating coil and a resistance in series with the armature of such a value as will render the amount of current in the armature circuit substantially independent of the counter-electromotive force of the meter armature, and means for connecting the coil in series with the armature across the circuit.

12. In an electric meter, a shaft, an armature carried thereby, and a coil mounted in proximity to the armature having a portion of its turns less than half wound in a direction opposite to that of the remaining portion.

13. In an electric meter, a shaft, an armature carried thereby, a coil mounted in inductive relation to the armature, means for connecting said coil in series in a circuit, a coil mounted in proximity to the armature having a portion of its turns less than half wound in a direction opposite to that of the remaining portion, and means for connecting the coil in series with the armature across the circuit.

14. In an electric meter, a coil, a support, means for securing the coil to the support comprising a clamp formed from a sheet-metal strip having an arm formed therein, means for securing the arm to the support, and a clip interlocking with the ends of the clamp and between which and the clamp the coil is tightly held.

15. In an electric meter, a casing, a supporting member in said casing, a field coil detachably secured to one side thereof, a moving element the shaft of which lies between the field coil and the supporting member, bearings for said shaft, and flexible leads for said coil extending through openings in said supporting member on one side of said coil and adapted to support said coil when said coil is swung away from said armature.

16. In an electric meter, a shaft, an armature carried thereby and provided with a commutator, a field coil in inductive relation to the armature, a support pivoted concentrically with the commutator, weighted members pivotally mounted on said support, brushes carried by said members and bearing on the commutator, and a register geared to the shaft.

17. In an electric meter, a shaft, an armature carried thereby provided with a commutator, a field coil in inductive relation to the armature, a support pivoted concentrically with the armature, means for clamping said support in position, weighted members pivotally mounted on said support, brushes carried by said members and bearing on the commutator, and a register geared to the shaft.

18. In an electric meter of the commutator type, a shaft, an armature carried thereby, a field coil mounted in inductive relation to the armature, a coil mounted in proximity to the armature and constituting both a friction compensating coil and a resistance in series with the armature of such a value as will render the amount of current in the armature circuit substantially independent of the counter-electromotive force of the meter armature, and means for adjusting the effect of said coil upon said armature.

19. In an electric meter of the commutator type, a shaft, an armature carried thereby, a field coil mounted in inductive relation to the armature, a coil mounted in proximity to the armature and constituting both a friction compensating coil and a resistance in series with the armature of such a value as will render the amount of current in the armature circuit substantially independent of the counter-electromotive force of the meter armature, and supporting means for said coil permitting the bodily adjustment of said coil with respect to said armature.

20. In an electric meter of the commutator type, a shaft, an armature carried thereby, a field coil mounted in inductive relation to the armature, a coil mounted in proximity to the armature and constituting both a friction compensating coil and a resistance in series with the armature of such a value as will render the amount of current in the armature circuit substantially independent of the counter-electromotive force of the meter armature, supporting means for said coil permitting the bodily adjustment of said coil with respect to said armature, and means for clamping said coil in position.

In witness whereof, we have hereunto set our hands this first day of June, 1905.

WILLIAM H. PRATT.
CHARLES E. HOLMES.

Witnesses:
JOHN A. McMANUS, Jr.,
ROBERT SHAND.